United States Patent
Kaneko et al.

(10) Patent No.: US 9,688,582 B2
(45) Date of Patent: *Jun. 27, 2017

(54) DIELECTRIC CERAMIC COMPOSITION AND CERAMIC ELECTRONIC DEVICE

(71) Applicant: TDK CORPORATION, Minato-ku, Tokyo (JP)

(72) Inventors: Toshihiko Kaneko, Tokyo (JP); Tatsuya Fujino, Tokyo (JP); Takeru Yoshida, Tokyo (JP); Haruki Ebina, Nikaho (JP); Nobuto Morigasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,436

(22) Filed: Mar. 8, 2016

(65) Prior Publication Data

US 2016/0264474 A1   Sep. 15, 2016

(30) Foreign Application Priority Data

Mar. 13, 2015 (JP) ................... 2015-050916

(51) Int. Cl.
*C04B 35/468* (2006.01)
*H01G 4/12* (2006.01)
(Continued)

(52) U.S. Cl.
CPC ........ *C04B 35/4682* (2013.01); *C04B 35/465* (2013.01); *C04B 35/47* (2013.01); *C04B 35/488* (2013.01); *C04B 35/49* (2013.01); *H01G 4/1209* (2013.01); *H01G 4/1227* (2013.01); *H01G 4/1236* (2013.01); *H01G 4/1245* (2013.01); *H01G 4/30* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3236* (2013.01); *C04B 2235/3239* (2013.01);

(Continued)

(58) Field of Classification Search
CPC .................... C04B 35/4682; H01G 4/1227
See application file for complete search history.

(56) References Cited

U.S. PATENT DOCUMENTS

| 7,273,825 B2 * | 9/2007 | Muto | H01G 4/30 361/321.4 |
| 7,397,649 B2 * | 7/2008 | Muto | C04B 35/4682 361/321.4 |
| 7,759,269 B2 * | 7/2010 | Takahashi | B82Y 30/00 501/138 |

FOREIGN PATENT DOCUMENTS

| JP | H07-037427 A | 2/1995 |
| JP | 2013227196 | * 11/2013 |

* cited by examiner

*Primary Examiner* — Karl Group
(74) *Attorney, Agent, or Firm* — Arent Fox LLP

(57) ABSTRACT

A dielectric ceramic composition and a ceramic electric device having a dielectric layer composed of the dielectric ceramic composition including a main component having a perovskite crystal structure expressed by general formula $ABO_3$, an oxide of Eu, an oxide of Ra (Sc, Er, Tm, Yb and Lu), an oxide of Rb (Y, Dy, Ho, Tb and Gd) and an oxide of Si, in which $0.075 \leq \alpha \leq 0.5$, $0.5 \leq \beta \leq 3$, $1.0 \leq \gamma \leq 4$, $1.5 \leq \delta \leq 5$, and $0.030 \leq \alpha/\delta \leq 0.250$ where a content of an oxide of Eu is $\alpha$ mole, a content of the oxide of Ra is $\beta$ mole, a content of the oxide of Rb is $\gamma$ mole, and a content of the second subcomponent is $\delta$ mole with respect to 100 moles of the main component.

7 Claims, 1 Drawing Sheet

(51) Int. Cl.
*C04B 35/465* (2006.01)
*C04B 35/47* (2006.01)
*C04B 35/488* (2006.01)
*C04B 35/49* (2006.01)
*H01G 4/30* (2006.01)

(52) U.S. Cl.
CPC ............... *C04B 2235/3248* (2013.01); *C04B 2235/3249* (2013.01); *C04B 2235/3256* (2013.01); *C04B 2235/3258* (2013.01); *C04B 2235/3262* (2013.01); *C04B 2235/3418* (2013.01); *C04B 2235/5454* (2013.01); *C04B 2235/6025* (2013.01); *C04B 2235/6562* (2013.01); *C04B 2235/6565* (2013.01); *C04B 2235/6567* (2013.01); *C04B 2235/6584* (2013.01); *C04B 2235/6588* (2013.01); *C04B 2235/768* (2013.01); *C04B 2235/79* (2013.01); *C04B 2237/68* (2013.01)

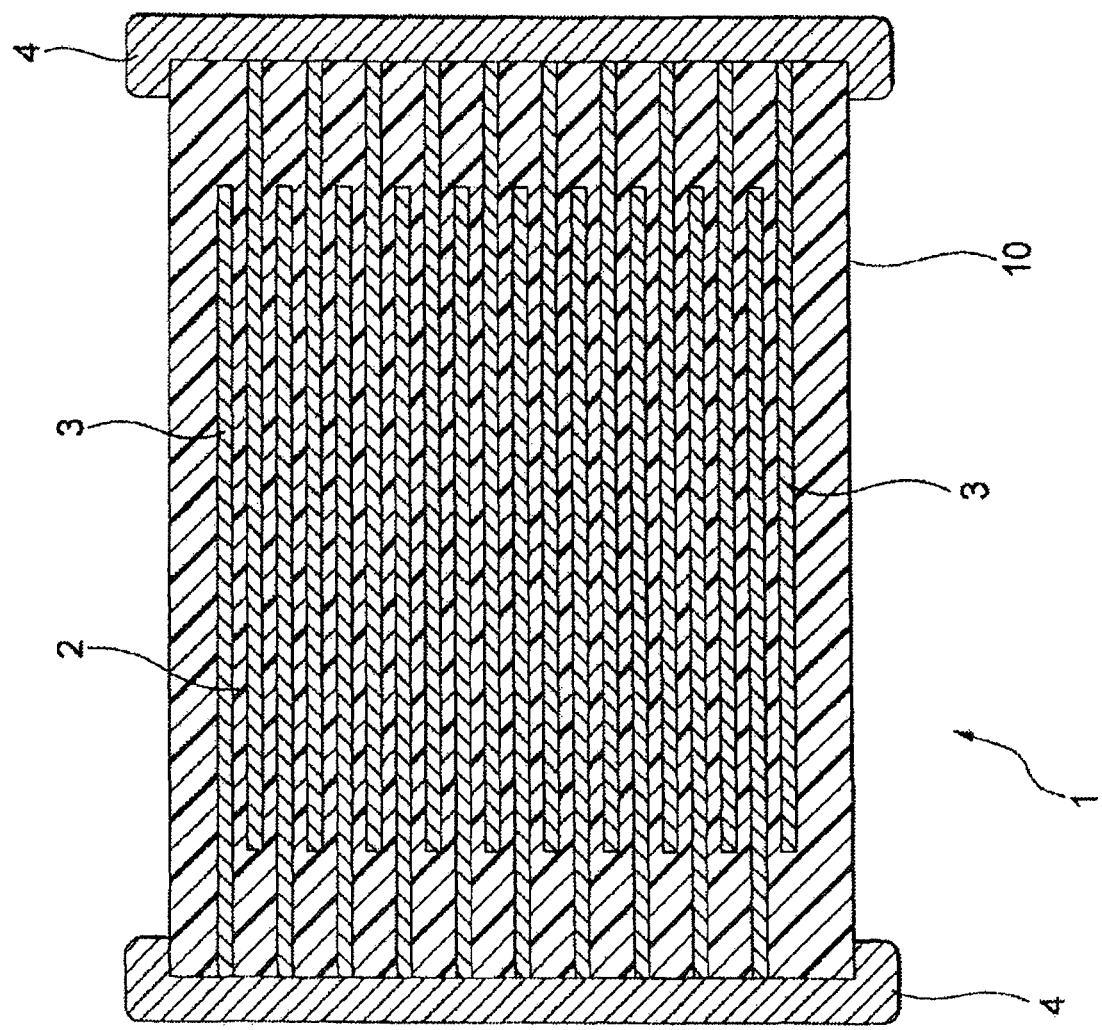

DIELECTRIC CERAMIC COMPOSITION AND CERAMIC ELECTRONIC DEVICE

BACKGROUND OF THE INVENTION

1. Field of the Invention

The present invention relates to a dielectric ceramic composition and a ceramic electronic device having a dielectric layer composed of the dielectric ceramic composition.

2. Description of the Related Art

A laminated ceramic capacitor as an example of a ceramic electronic device is widely used as an electronic device which has a small size and exhibits high performance and high reliability, and a number of laminated ceramic capacitors are mounted as an electronic device for motor vehicle.

The laminated ceramic capacitor for mounting on a motor vehicle is essentially required to be adaptable to even a high-temperature and high-voltage environment as well as to have a small size and to exhibit high performance. In recent years, the laminated ceramic capacitor is required to be improved in operation guarantee and reliability in a high-temperature environment of from 125 to 150° C. and at from 16 V to 100 V.

A laminated ceramic capacitor exhibiting high reliability while meeting the X8R characteristics is described in Patent Literature 1. In addition, Patent Literature 1 mentions that a thickness of the dielectric ceramic layer composed of the laminated ceramic capacitor can be thinned to 10 to 15 μm.

In recent years, however, it has been required that the laminated ceramic capacitor is further miniaturized and the dielectric layer is thinned. It has been known that the reliability decreases when the dielectric layer is thinned in association with the miniaturization of the laminated ceramic capacitor as the electric field intensity to the dielectric layer is stronger even though the same voltage is applied.

Patent Literature 1: Japanese Unexamined Patent Publication No. H7-37427

SUMMARY OF THE INVENTION

The present invention has been made in view of such circumstances, and an object thereof is to provide a dielectric ceramic composition exhibiting favorable temperature characteristics and sufficient reliability in a case in which the dielectric layer is thinner than that of the prior art and the electric field intensity applied to the dielectric layer is increased and in a case in which the number of laminated layers is increased, and an electronic device.

Means for Solving the Problem

In order to achieve the above object, the dielectric ceramic composition according to the present invention is a dielectric ceramic composition which includes:

a main component having a perovskite crystal structure expressed by general formula $ABO_3$ where A is at least one selected from Ba, Ca, and Sr and B is at least one selected from Ti and Zr;

a first sub-component of oxides of at least three rare earth elements containing Eu; and a second sub-component of an oxide of Si, wherein at least an oxide of Eu, an oxide of Ra and an oxide of Rb are contained as the first sub-component where Ra is at least one selected from Sc, Er, Tm, Yb and Lu, and Rb is at least one selected from Y, Dy, Ho, Tb and Gd, $0.075 \leq \alpha \leq 0.5$, $0.5 \leq \beta \leq 3$, $1.0 \leq \gamma \leq 4$, $1.5 \leq \delta \leq 5$, and $0.030 \leq \alpha/\delta \leq 0.250$ where a content of an oxide of Eu is $\alpha$ mole in terms of $Eu_2O_3$, a content of the oxide of Ra is $\beta$ mole in terms of $Ra_2O_3$, a content of the oxide of Rb is $\gamma$ mole in terms of $Rb_2O_3$, and a content of the second sub-component is $\delta$ mole in terms of $SiO_2$ with respect to 100 moles of the main component.

The dielectric ceramic composition according to the present invention can be used for a dielectric layer of a ceramic electronic device. Further, it is possible to obtain a ceramic electric device in which the change of capacitance is small in a wide temperature range of from −55 to 150° C., the insulation resistance is high even at a high temperature of about 150° C., and the highly accelerated life time is excellent even if the thickness of the dielectric layer is thinned to 2 μm or less.

It is preferable that the dielectric ceramic composition further includes a third sub-component of an oxide of Ba and/or an oxide of Ca where a content of the third sub-component with respect to 100 moles of the main component is from 0.5 to 4 moles in terms of BaO or CaO.

It is preferable that the dielectric ceramic composition further includes a fourth sub-component of an oxide of Mn and/or an oxide of Cr where a content of the fourth sub-component with respect to 100 moles of the main component is from 0.05 to 0.3 moles in terms of MnO or $Cr_2O_3$.

It is preferable that the dielectric ceramic composition further includes a fifth sub-component of at least one selected from an oxide of V, an oxide of Mo, and an oxide of W, where a content of the fifth sub-component with respect to 100 moles of the main component is from 0.010 to 0.15 moles in terms of $V_2O_5$, $Mo_2O_3$, or $WO_3$.

It is preferable that the dielectric ceramic composition further includes a sixth sub-component of an oxide of Mg where a content of the sixth sub-component with respect to 100 moles of the main component is from 0.5 to 1.8 moles in terms of MgO.

The present invention further relates to a ceramic electronic device which includes a dielectric layer formed of the dielectric ceramic composition and electrode layers.

The present invention further relates to a ceramic electronic device in which the thickness of the dielectric layer is 2 μm or less.

The ceramic electronic device according to the present invention has a small size and a high capacitance and shows high reliability while meeting the X8R characteristics of the EIA standards even if the thickness of the dielectric layer is thinned to 2 μm or less. Further, it is also possible that a lamination number is increased more than conventional electronic devices when the ceramic electronic device according to the present invention is a laminated ceramic electronic device. In addition the electric field intensity applicable to the dielectric layer is increased.

In addition, a laminated ceramic capacitor device which is composed of a dielectric layer composed of this dielectric ceramic composition is capable of stably operating in various kinds of instruments used in a severe environment such as an electronic apparatus of a motor vehicle, and thus it is possible to significantly improve the reliability of the instrument to which the ceramic electronic device is applied.

BRIEF DESCRIPTION OF THE DRAWINGS

FIG. 1 is a cross-sectional view of a laminated ceramic capacitor according to an embodiment of the present invention.

DESCRIPTION OF THE PREFERRED EMBODIMENTS

Hereinafter, the present invention will be explained with reference to embodiments illustrated in the drawings.

(Laminated Ceramic Capacitor)

As illustrated in FIGURE, a laminated ceramic capacitor 1 as an example of ceramic electronic devices includes a capacitor device body 10 having a configuration in which a dielectric layer 2 and an internal electrode layer 3 are alternately laminated. The internal electrode layer 3 is laminated such that each end face thereof is alternately exposed to the surfaces of two end portions facing the capacitor device body 10. A pair of external electrodes 4 are formed at both end portions of the capacitor device body 10 and connected to the exposed end faces of the internal electrode layers 3 which are alternately disposed to form a capacitor circuit.

The shape of the capacitor device body 10 is not particularly limited, but it is usually a rectangular parallelepiped as illustrated in FIGURE. In addition, the dimensions thereof are not also particularly limited.

(Dielectric Layer)

The dielectric layer 2 is composed of the dielectric ceramic composition according to the present embodiment. The dielectric ceramic composition according to the present embodiment contains a compound having a perovskite crystal structure expressed by general formula $ABO_3$ (A is at least one selected from Ba, Ca, and Sr and B is at least one selected from Ti and Zr) as a main component. In addition, the dielectric ceramic composition according to the present embodiment contains dielectric particles containing $ABO_3$ as a main component.

Specific examples of the compound expressed by general formula $ABO_3$ may include a compound represented by $\{(Ba_{1-x-y}Ca_xSr_y)O\}_u(Ti_{1-z}Zr_z)_vO_3$. Incidentally, the values of u, v, x, y, or z are not particularly limited.

In the formula above, x is preferably $0 \leq x \leq 0.1$ and more preferably $0 \leq x \leq 0.05$. As x is in the above range, it is possible to control the temperature characteristics and specific dielectric constant of the dielectric layer composed of the dielectric ceramic composition according to the present embodiment within a favorable range. The specific dielectric constant of the dielectric layer tends to become too low when x is too large. In addition, in the present embodiment, Ca may not be necessarily contained. In other words, x may be 0.

In the formula above, y is preferably $0 \leq y \leq 0.1$ and more preferably $0 \leq y \leq 0.05$. As y is in the above range, it is possible to improve the specific dielectric constant of the dielectric layer composed of the dielectric ceramic composition according to the present embodiment. The temperature characteristics of the dielectric layer tends to deteriorate when y is too large. In addition, in the present embodiment, Sr may not be necessarily contained. In other words, y may be 0.

In the formula above, z is preferably $0 \leq z \leq 0.3$ and more preferably $0 \leq z \leq 0.15$. As z is in the above range, it is possible to improve the specific dielectric constant of the dielectric layer composed of the dielectric ceramic composition according to the present embodiment. The temperature characteristics of the dielectric layer tends to deteriorate when z is too large. In addition, in the present embodiment, Zr may not be necessarily contained. In other words, z may be 0.

In addition, it is preferable that the main component of the dielectric ceramic composition according to the present embodiment is barium titanate. In other words, it is preferable that x=y=z=0.

The dielectric ceramic composition according to the present invention at least contains a first sub-component of oxides of at least three rare earth elements containing Eu and a second sub-component of an oxide of Si as the sub-component together with the main component.

The first sub-component contains at least an oxide of Eu, an oxide of Ra and an oxide of Rb. Further, Ra is at least one selected from Sc, Er, Tm, Yb and Lu, and Rb is at least one selected from Y, Dy, Ho, Tb and Gd. In addition, it is preferable that an oxide of Yb is used as an oxide of Ra. Moreover, it is even more preferable that an oxide of Y is used as an oxide of Rb and both the oxide of Y and the oxide of Tb are used.

When the content of an oxide of Eu with respect to 100 moles of the main component is $\alpha$ mole in terms of $Eu_2O_3$, $\alpha$ is preferably 0.075 or more and 0.5 or less and more preferably 0.10 or more and 0.4 or less. The temperature characteristics of capacitance and highly accelerated life time become favorable even when the thickness of the dielectric layer 2 is thinned to 2 μm or less as $\alpha$ is set to be within the above range.

When the content of an oxide of Ra with respect to 100 moles of the main component is $\beta$ mole in terms of $Ra_2O_3$, $\beta$ is preferably 0.5 or more and 3 or less and more preferably 1.0 or more and 2.5 or less. The temperature characteristics of capacitance and highly accelerated life time become favorable even when the thickness of the dielectric layer 2 is thinned to 2 μm or less as $\beta$ is set to be within the above range.

When the content of an oxide of Rb with respect to 100 moles of the main component is $\gamma$ mole in terms of $Rb_2O_3$, $\gamma$ is preferably 1.0 or more and 4 or less and more preferably 1.4 or more and 3 or less. The temperature characteristics of capacitance and highly accelerated life time become favorable even when the thickness of the dielectric layer 2 is thinned to 2 μm or less as $\gamma$ is set to be within the above range.

When the content of an oxide of Si with respect to 100 moles of the main component is $\delta$ mole in terms of $SiO_2$, $\delta$ is preferably 1.5 or more and 5 or less and more preferably 2 or more and 4 or less. The temperature characteristics of capacitance and highly accelerated life time become favorable even when the thickness of the dielectric layer 2 is thinned to 2 μm or less as $\gamma$ is set to be within the above range.

The content $\alpha$ of the oxide of Eu and the content $\delta$ of the oxide of Si meet $0.030 \leq \alpha/\delta \leq 0.250$ and preferably $0.05 \leq \alpha/\delta \leq 0.2$. The temperature characteristics of capacitance and highly accelerated life time become favorable even when the thickness of the dielectric layer 2 is thinned to 2 μm or less as $\alpha/\delta$ is set to be within the above range.

As described above, in the present embodiment, an oxide of Eu, an oxide of Ra, and an oxide of Rb are contained as the first sub-component together with the main component. Here, Eu, Ra, and Rb are classified in accordance with the size of the ionic radius of each rare earth element. The ionic radius of Eu is large, the ionic radius of Ra is small, and the ionic radius of Rb is positioned in the middle of the ionic radius of Eu and the ionic radius of Ra.

An oxide of Eu, an oxide of Ra, and an oxide of Rb are dissolved in the dielectric particles containing the main component in a solid state. As the oxides of the respective rare earth elements are dissolved in the dielectric particles in a solid state, the dielectric particles form a so-called core-shell structure.

There is a tendency that the Curie temperature of the main component shifts to a high-temperature side and the temperature characteristics of capacitance becomes favorable as the content of the oxide of Ra is increased. But the highly accelerated life time tends to deteriorate when the content of the oxide of Ra becomes too large.

On the other hand, there is a tendency that the highly accelerated life time is improved as the content of the oxide of Eu and/or the content of the oxide of Rb is increased. But the temperature characteristics of capacitance tends to deteriorate when the content of the oxide of Eu and/or the content of the oxide of Rb becomes too large.

In addition, in the present embodiment, an oxide of Si, for example, $SiO_2$ are contained as the second sub-component. Incidentally, $SiO_2$ has a function as a sintering aid. Here, an oxide of Si is likely to form a composite oxide with the first sub-component. Furthermore, the particles of a composite oxide of the first sub-component and the second sub-component are segregated separately from the core-shell particles to form particles constituting the dielectric ceramic composition.

When the second sub-component becomes excessive and the composite oxide is excessively formed, the first sub-component for forming the core-shell structure becomes insufficient. As a result, it is assumed that the highly accelerated life time and/or the temperature characteristics of capacitance deteriorate as a local defect of the dielectric particles which formed the core-shell structure is generated.

The impact caused by insufficiency of an oxide of Eu is particularly large among the first sub-component. A local defect of the dielectric particles which formed the core-shell structure containing Eu is generated by segregation of the composite oxide of the oxide of Eu and the second sub-component, thereby the highly accelerated life time and the temperature characteristics of capacitance tend to deteriorate.

In addition, in the present embodiment, it is possible to further improve the characteristics of the dielectric ceramic composition as the dielectric ceramic composition further contains a third sub-component including at least one selected from oxides of Ba and Ca, a fourth sub-component including at least one selected from oxides of Mn and Cr, a fifth sub-component including at least one selected from oxides of V, Mo, and W, and a sixth sub-component of an oxide of Mg in amounts to be within predetermined ranges.

The third sub-component is an arbitrary component. As the third sub-component is contained, the abnormal grain growth of the dielectric particles containing the main component is suppressed and a decrease in highly accelerated life time due to the abnormal grain growth is suppressed. In addition, although the upper limit of the content of the third sub-component is not regulated, it is possible to suppress an increase in sintering temperature and the structural change of the dielectric ceramic composition by setting the content of the third sub-component to an appropriate amount.

The content of the third sub-component with respect to 100 moles of the main component is preferably 0.5 mole or more and 4 moles or less and more preferably 1.5 mole or more and 4 moles or less in terms of BaO or CaO. In addition, it is preferable to contain at least an oxide of Ba as the third sub-component.

Furthermore, in a case in which the total substance amount of Ba, Ca, and Sr contained in the main component and Ba and Ca contained in the third sub-component is denoted as $A_t$ and the total substance amount of Ti and Zr contained in the main component is denoted as $B_t$, it is preferably $1.004 \leq A_t/B_t \leq 1.054$ and it is more preferably $1.009 \leq A_t/B_t \leq 1.054$.

The fourth sub-component is an arbitrary component. It is possible to further improve the highly accelerated life time as the fourth sub-component is contained in an appropriate amount. The content of the fourth sub-component with respect to 100 moles of the main component is preferably 0.05 mole or more and 0.3 moles or less and more preferably 0.1 mole or more and 0.3 moles or less in terms of MnO or $Cr_2O_3$. In addition, in the present embodiment, it is preferable to contain at least an oxide of Mn as the fourth sub-component.

The fifth sub-component is an arbitrary component. It is possible to further improve the highly accelerated life time as the fifth sub-component is contained. In addition, although the upper limit of the content of the fifth sub-component is not regulated, it is possible to suppress a decrease in insulation resistance as the content of the fifth sub-component is set to an appropriate amount. Hence, the content of the fifth sub-component with respect to 100 moles of the main component is preferably 0.01 mole or more and 0.15 mole or less and more preferably 0.05 mole or more and 0.1 mole or less in terms of $V_2O_5$, $Mo_2O_3$, or $WO_3$. In addition, it is preferable to contain at least an oxide of V as the fifth sub-component.

The sixth sub-component is an arbitrary component. The abnormal grain growth of the dielectric particles containing the main component is prevented and also sintering is promoted as the sixth sub-component is contained in an appropriate amount. As a result, the highly accelerated life time is improved. In the present embodiment, the content of the sixth sub-component with respect to 100 moles of the main component is preferably 0.5 mole or more and 1.8 moles or less and more preferably 0.6 mole or more and 1.2 moles or less in terms of MgO.

The average crystal grain size of the dielectric ceramic composition of the present embodiment is not particularly limited. It can be appropriately determined from the range of, for example, from 0.1 to 3.0 µm depending on the thickness of the dielectric layer, but it may be out of the above range.

In general, the temperature characteristics of capacitance in the ceramic electronic device tend to deteriorate as the dielectric layer is thinner. This is derived from the fact that it is inevitably required to decrease the average crystal grain size of the dielectric ceramic composition in order to thin the dielectric layer and thus the temperature characteristics of capacitance of the ceramic electronic device tend to deteriorate as the average crystal grain size is smaller. The dielectric ceramic composition of the present embodiment is particularly suitably used in a case in which the average crystal grain size is required to be decreased, specifically, in a case in which the average crystal grain size is required to be from 0.1 to 0.5 µm. In addition, in general, the highly accelerated life time is favorable and the time dependent change in capacitance in a direct current electric field is small in a case in which the average crystal grain size is small. It is preferable to set the average crystal grain size as small as from 0.1 to 0.5 µm from this point of view as well.

The thickness of the dielectric layer composed of the dielectric ceramic composition of the present embodiment is not particularly limited. The X8R characteristics are met and thus high reliability can be achieved even in a case in which the thickness of the dielectric layer is from about 3 μm to about 5 μm per one layer. Further, the X8R characteristics are met and thus high reliability can be achieved even in a case in which the thickness of the dielectric layer is 2 μm or less per one layer.

From the above, the dielectric ceramic composition of the present embodiment is effective in improving the temperature characteristics of capacitance of a laminated ceramic capacitor having a thinned dielectric layer. Incidentally, the number of dielectric layers laminated in the laminated ceramic capacitor using the dielectric ceramic composition of the present embodiment is usually about from 2 to 300.

The laminated ceramic capacitor using the dielectric ceramic composition according to the present invention is suitably used as an electronic device for an instrument that is used in an environment of 80° C. or higher, particularly, from 125 to 150° C. Moreover, in such a temperature range, the temperature characteristics of capacitance meet the R characteristics of the EIA standards, and further, also meet the X8R characteristics as well. In addition, it is also possible to meet the B characteristics (rate of change in capacitance at from −25 to 85° C. is within ±10%) of the EIAJ standards and the X7R characteristics ($\Delta C=\pm 15\%$ or less at from −55 to 125° C.) of the EIA standards at the same time.

In usual use of a general laminated ceramic capacitor, an alternating electric field of 0.1 V/μm or more and about 5 V/μm or less and a direct current electric field of 5 V/μm or more and about 50 V/μm or less to be superimposed on the alternating electric field are applied to the dielectric layer. The temperature characteristics of capacitance of the laminated ceramic capacitor using the dielectric ceramic composition of the present embodiment is significantly stable even though such an electric field is applied. Particularly, the temperature characteristics of capacitance is significantly stable even though an alternating electric field of 0.5 V/μm or more and about 5 V/μm or less and a direct current electric field of 5 V/μm or more and about 50 V/μm or less to be superimposed on the alternating electric field are applied to the dielectric layer.

(Internal Electrode Layer)

The electrically conductive material contained in the internal electrode layer 3 is not particularly limited, but it is possible to use a relatively inexpensive base metal since the material constituting the dielectric layer exhibits reduction resistance. Ni or an Ni alloy is preferable in the case of using a base metal as the electrically conductive material. As the Ni alloy, an alloy of Ni and one or more kinds of elements selected from Mn, Cr, Co, and Al is preferable. The content of Ni in the alloy is preferably 95 wt % or more. Incidentally, the respective trace components such as P may be contained in Ni or the Ni alloy at about 0.1 wt % or less in total. The thickness of the internal electrode layer 3 may be appropriately changed depending on the use, and it is not particularly limited. Usually, it is from 0.1 to 3.0 μm and preferably about from 0.5 to 2.0 μm.

(External Electrode)

The electrically conductive material contained in the external electrode 4 is not particularly limited, but in the present embodiment, it is possible to use inexpensive Ni, Cu, or an alloy thereof. The thickness of the external electrode 4 may be appropriately determined depending on the use and the like, but it is preferably usually about from 10 to 50 μm.

(Method Manufacturing Laminated Ceramic Capacitor 1)

The laminated ceramic capacitor 1 of the present embodiment is manufactured by fabricating a green chip by a usual printing method or sheet method using a paste, firing this, then printing or transferring the external electrode thereon, and then firing the resultant in the same manner as in the laminated ceramic capacitor of the prior art. Hereinafter, the manufacturing method will be specifically described.

First, a dielectric raw material (dielectric ceramic composition powder) is prepared, and this is formed into a coating to adjust a paste (paste for dielectric layer) for forming the dielectric layer.

(Dielectric Raw Material)

First, a raw materials for $ABO_3$ is prepared as the raw material for the main component of the dielectric raw material. It is preferable to use barium titanate represented by $Ba_uTi_vO_3$ as $ABO_3$.

As the raw materials for $ABO_3$, it is possible to use those which are manufactured by various methods such various kinds of liquid phase methods (for example, an oxalic acid method, a hydrothermal synthesis method, an alkoxide method, and a sol-gel method) in addition to the so-called solid phase method.

In addition, in the case of using barium titanate represented by $Ba_uTi_vO_3$ as the raw materials for $ABO_3$, it is preferable that u/v is in the range of $1.000 \leq u/v \leq 1.005$. It is easy to suitably control the grain growth at the time of firing as u/v is set to be in the above range. Moreover, the temperature characteristics and highly accelerated life time are improved.

In the case of using barium titanate as a main component, the average particle size of the barium titanate raw material is not particularly limited, but it is preferably from 0.10 to 0.3 μm and more preferably from 0.12 to 0.17 μm. It is easy to suitably control sintering as the particle size of the barium titanate raw material to be used is set to be in the above range. Moreover, the reliability and temperature characteristics of the ceramic electronic device finally obtained are improved.

As the raw material for the sub-component, it is possible to use the oxides, mixtures, or composite oxides of the components described above. In addition, it is also possible to use various kinds of compounds to be the oxides or composite oxides described above by firing as a mixture. Examples of the various kinds of compounds may include a carbonate, an oxalate, a nitrate, a hydroxide, and an organometallic compound. In addition, the average particle size of the raw material for the sub-component is preferably smaller than the average particle size of the raw material for the main component. More preferably, the average particle size of the raw material for the sub-component is ½ or less of the average particle size of the raw material for the main component.

The method for manufacturing the dielectric ceramic composition powder is not particularly limited. Examples of the method other than the method described above may include a method in which the sub-component is coated on the barium titanate powder. The kind of the sub-component to be coated is also not particularly limited. It is preferably one or more kinds of oxides selected from an oxide of rare earth element (Eu, Ra, and Rb) (first sub-component), an oxide of Mg (sixth sub-component), and an oxide of Si (second sub-component). As the method for coating, a known method may be used. For example, it is possible to coat each sub-component on the barium titanate particle surface by preparing an oxide of rare earth element (Eu, Ra, and Rb), an oxide of Mg, and an oxide of Si as a solution, mixing the solution with the slurry in which barium titanate is dispersed, and then subjecting the mixture to the heat treatment.

The content of each compound in the dielectric raw material is determined so as to have the composition of the dielectric ceramic composition after firing. Incidentally, the present inventors have confirmed that the composition of the dielectric ceramic composition does not substantially change before and after firing except a special case such as a case in which a portion of each sub-component described above is vaporized at the time of firing in the present embodiment.

(Paste for Dielectric Layer)

The paste for dielectric layer may be an organic coating obtained by kneading the dielectric raw material with an organic vehicle or an aqueous coating obtained by kneading a dielectric raw material with an aqueous vehicle.

The organic vehicle is one obtained by dissolving a binder in an organic solvent. The kind of the binder is not particularly limited, and it may be appropriately selected from various kinds of binders used in a general organic vehicle such as ethyl cellulose and polyvinyl butyral. The kind of the organic solvent is also not particularly limited, and it may be appropriately selected from various kinds of organic solvents such as terpineol, butyl carbitol, acetone, and toluene depending on the method used for printing and laminating of dielectric layer (e.g., printing method and sheet method).

The aqueous vehicle is one obtained by dissolving a water-soluble binder, dispersant, or the like in water. The kind of the water-soluble binder used in the aqueous vehicle is not particularly limited, and it may be appropriately selected from various kinds of binders used in a general aqueous vehicle such as polyvinyl alcohol, cellulose, and a water-soluble acrylic resin.

(Paste for Internal Electrode)

The paste for internal electrode layer is prepared by kneading an electrically conductive material and an organic vehicle. The electrically conductive material composed of the various kinds of electrically conductive metals or alloys described above or various kinds of oxides, organometallic compounds, or resinates which are converted into the electrically conductive material described above by firing are used for the electrically conductive material. The same organic vehicle as that used for the paste for dielectric layer may be selected for the organic vehicle. In addition, the paste for internal electrode layer may contain a common material. The kind of the common material is not particularly limited, but it is preferable that barium titanate is contained as the common material.

(Paste for External Electrode)

The paste for external electrode may be prepared in the same manner as the paste for internal electrode layer described above.

The content of the organic vehicle in each pastes described above is not particularly limited, and it may be a usual content, for example, the binder is about from 1 to 10 wt % and the solvent is about from 10 to 50 wt %. In addition, additives selected from inorganic substances and organic substances such as various kinds of dispersant, plasticizers, dielectrics, and insulators may be contained in each paste if necessary. The total content thereof is preferably 10 wt % or less.

(Printing and Lamination)

In the case of using the printing method, the paste for dielectric layer and the paste for internal electrode layer are printed on a substrate, such as PET, laminated, cut into a predetermined shape, and then peeled off from the substrate to obtain a green chip.

In addition, in the case of using the sheet method, a green sheet is formed using the paste for dielectric layer, the paste for internal electrode layer is printed thereon to form an internal electrode pattern, and this is then laminated to obtain a green chip.

(Binder Removal)

The conditions for binder removal are not particularly limited, but the temperature increasing speed is preferably set to from 5 to 300° C./hour, the retention temperature is preferably set to from 180 to 800° C., and the temperature retention time is preferably set to from 0.5 to 48 hours. In addition, the atmosphere for binder removal is preferably set to be in the air or a reducing atmosphere.

(Firing)

The green chip is fired after binder removal. The temperature increasing speed is preferably from 600 to 10000° C./hour and more preferably from 2000 to 10000° C./hour. The retention temperature at the time of firing is preferably 1300° C. or lower and more preferably from 1180 to 1290° C. The retention time at the time of firing is preferably from 0.05 to 20 hours and more preferably from 0.1 to 4 hours. As the temperature increasing speed and the retention time are controlled in the above ranges, the highly accelerated life time is improved. Incidentally, the temperature decreasing speed is not particularly limited, but it is preferably from 50 to 1000° C./hour.

The atmosphere for firing is preferably a reducing atmosphere. The atmosphere gas is not particularly limited, and for example, it is possible to use a mixed gas of $N_2$ and $H_2$ by humidifying.

The oxygen partial pressure at the time of firing may be appropriately determined depending on the kind of the electrically conductive material in the paste for internal electrode. For example, in the case of using a base metal such as Ni or a Ni alloy as the electrically conducting material, it is preferable to set the oxygen partial pressure in the firing atmosphere to from $10^{-14}$ to $10^{-10}$ MPa. As the oxygen partial pressure is set to be within the above range, sintering of the electrically conductive material of the internal electrode layer is likely to be normally conducted while preventing the oxidation of the internal electrode layer.

(Annealing)

It is preferable to subject the capacitor device body 10 to the annealing treatment after being fired in a reducing atmosphere. Annealing is a treatment for reoxidizing the dielectric layer, and this makes it possible to significantly increase the insulation resistance (IR) of the dielectric layer and to improve the highly accelerated life time (IR life time).

The atmosphere at the time of annealing is not particularly limited, but it is preferable to set the oxygen partial pressure to from $10^{-9}$ to $10^{-5}$ MPa. As the oxygen partial pressure is set to be within the above range, it is easy to reoxidize the dielectric layers while preventing the oxidation of the internal electrode layer.

The retention temperature at the time of annealing is not particularly limited, but it is set to preferably 1100° C. or lower and even more preferably from 950 to 1090° C. The dielectric layer is likely to be sufficiently oxidized as the retention temperature is set to be within the above range. In addition, the oxidation of the internal electrode layer and the reaction of the internal electrode layer with the dielectric layer are prevented and the temperature characteristics of capacitance, insulation resistance (IR), highly accelerated life time (IR life time), and the capacitance of the dielectric layer are likely to be favorable.

As the conditions for annealing other than those described above, the temperature retention time is set to preferably from 0 to 20 hours and more preferably from 2 to 4 hours. The temperature decreasing speed is set to preferably from 50 to 1000° C./hour and more preferably from 100 to 600° C./hour. In addition, the kind of atmosphere gas for annealing is not particularly limited, but for example, it is preferable to use humidified $N_2$ gas.

In order to humidify $N_2$ gas, a mixed gas, or the like in the binder removal treatment, firing, and annealing, for example, a wetter or the like may be used. The water temperature is preferably about from 5 to 75° C. in the case of using a wetter.

The binder removal treatment, firing, and annealing may be continuously conducted or each of them may be independently conducted.

EXAMPLES

Hereinafter, the present invention will be explained with reference to further detailed Examples, but the present invention is not limited to these Examples.

Example 1

A $Ba_uTi_vO_3$ powder (u/v=1.004) of which the average particle size was 120 to 170 nm was prepared as a raw material powder of barium titanate of the main component.

A $Eu_2O_3$ powder, a $Yb_2O_3$ powder, and a $Tb_2O_{3.5}$ powder and a $Y_2O_3$ powder were prepared, respectively, as a raw material powder of an oxide of Eu, as a raw material powder of an oxide of Ra, and as a raw material powder of an oxide of Rb which were the first sub-component.

A $SiO_2$ powder was prepared as a raw material powder of an oxide of Si which was the second sub-component.

A $BaCO_3$ powder was prepared as a raw material powder of an oxide of Ba which was the third sub-component.

A $MnCO_3$ powder was prepared as a raw material powder of an oxide of Mn which was the fourth sub-component.

A $V_2O_5$ powder was prepared as a raw material powder of an oxide of V which was the fifth sub-component.

A MgO powder was prepared as a raw material powder of an oxide of Mg which was the sixth sub-component.

Incidentally, the raw material powders for all the sub-components were subjected to preliminary grinding so as to arrange the average particle size of all the sub-components in 50 to 75 nm, respectively.

Next, the raw material powder for each sub-component was weighed such that the content thereof with respect to 100 moles of barium titanate was the content presented in the following Table 1 and Table 2. With regard to the raw material powders for the third to sixth sub-components of Sample Nos. 1 to 29, the $BaCO_3$ powder was weighed by 2 moles, the $MnCO_3$ powder was weighed by 0.2 mole, the $V_2O_5$ powder was weighed by 0.05 mole, and the MgO powder was weighed by 0.9 mole. These respective powders were wet mixed in a ball mill for 20 hours, ground, and dried, thereby obtaining a dielectric raw material. Incidentally, $BaCO_3$ and $MnCO_3$ are converted into BaO and MnO by firing to be contained in the dielectric ceramic composition.

Subsequently, the dielectric raw material thus obtained: 100 parts by weight, a polyvinyl butyral resin: 10 parts by weight, dioctyl phthalate (DOP): 5 parts by weight, and an alcohol: 100 parts by weight were mixed together in a ball mill to form a paste, thereby obtaining a paste for dielectric layer. Incidentally, in the paste for dielectric layer, DOP is a plasticizer and the alcohol is a solvent.

In addition, separately from the paste for dielectric layer, Ni particles: 44.6 parts by weight, terpineol: 52 parts by weight, ethylcellulose: 3 parts by weight, and benzotriazole: a 0.4 part by weight were kneaded using a three-rollers milling machine to form a paste, thereby preparing a paste for internal electrode layer.

Thereafter, a green sheet was formed on a PET film using the paste for dielectric layer. The green sheet was formed such that the thickness thereof after drying became 2.5 μm.

Subsequently, an electrode layer in a predetermined pattern was printed on the green sheet using the paste for internal electrode layer. The green sheet was peeled off from the PET film after printing the electrode layer, thereby fabricating a green sheet having an electrode layer.

Subsequently, a plurality of the green sheets having an electrode layer were laminated and pressure bonded to form a green laminate, and the green laminate was cut in a predetermined size to obtain a green chip.

Subsequently, the green chip thus obtained was subjected to the binder removal treatment, firing, and annealing under the following conditions, thereby obtaining a laminated and fired ceramic body.

The conditions for binder removal treatment were set as follows; temperature increasing speed: 25° C./hour, retention temperature: 235° C., retention time: 8 hours, and atmosphere: in the air.

The conditions for firing were set as follows; temperature increasing speed: 600° C./hour, retention temperature: 1260° C., retention time: 1 hour, temperature decreasing speed: 200° C./hour, atmosphere gas: humidified $N_2+H_2$ mixed gas, and oxygen partial pressure: $10^{-12}$ MPa.

The conditions for annealing were set as follows; temperature increasing speed: 200° C./hour, retention temperature: 1050° C., retention time: 3 hours, temperature decreasing speed: 200° C./hour, atmosphere gas: humidified $N_2$ gas, and oxygen partial pressure: $10^{-7}$ MPa.

Incidentally, a wetter was used for the humidification of the atmosphere gas at the time of firing and annealing.

Subsequently, the end face of the laminated and fired ceramic body thus obtained was subjected to barrel polishing. The paste for external electrode was coated on the end face subjected to the barrel polishing, and the resultant was subjected to the baking treatment in a reducing atmosphere, thereby obtaining samples for laminated ceramic capacitor (hereinafter, simply referred to as the "capacitor sample" in some cases) of Sample Nos. 1 to 51 presented in Tables 1 and 2. In addition, the capacitor samples in which the interlayer thickness of the dielectric layer was 2.0 μm and the same in which the interlayer thickness of the dielectric layer was 3.0 μm were prepared for the compositions of each Sample numbers. Incidentally, the size of the capacitor samples thus obtained was 3.2 mm×1.6 mm×1.2 mm, the thickness of the internal electrode was 1.0 μm, and the number of dielectric layers was 100 layers.

For the capacitor samples thus obtained, the measurement of CR product (only for the capacitor samples in which the interlayer thickness of the dielectric layer was 2.0 μm), the temperature characteristics of capacitance (X8R characteristics), and the highly accelerated life time (HALT) was carried out by the following methods, respectively. The measurement results are presented in Tables 1 and 2.

(CR Product)

The capacitance C of the capacitor samples in which the interlayer thickness of the dielectric layer was 2.0 μm was measured using a digital LCR meter at a reference temperature 25° C. under the conditions having a frequency of 1.0 kHz and an input signal level (voltage for measurement) of 1.0 Vrms. In addition, the insulation resistance IR of the capacitor samples in which the interlayer thickness of the dielectric layer was 2.0 μm was measured using an insulation resistance meter at 25° C. after a direct current voltage 25V was applied for one minute. The CR product was calculated by obtaining the product of the capacitance C (μF) and the insulation resistance IR (MΩ) measured above. In Tables 1 and 2, ○ is granted to the sample in which the CR product is 1000 or more, and Δ is granted to the sample in which the CR product is less than 1000. Though it is preferable that the CR product is 1000 or more, the purpose of the present invention can be attained if the temperature characteristics of capacitance and the highly accelerated life time are excellent, even though the CR product is less than 1000.

(Temperature Characteristics of Capacitance)

The capacitance of the capacitor samples in which the interlayer thickness of the dielectric layer was 2.0 μm and the same in which the interlayer thickness of the dielectric layer was 3.0 μm was measured at from −55 to 155° C. under the conditions having a frequency of 1.0 kHz and an input signal level (voltage for measurement) of 1.0 Vrms. And, the rate of variation in capacitance to the temperature variation was calculated on the basis of the capacitance at 25° C. In addition, whether the calculated rate of variation in capacitance met the X8R characteristics of the temperature characteristics of the EIA standards or not was evaluated. The sample which met the X8R characteristics was evaluated to be favorable. In Tables 1 and 2, ○ is granted to the sample which meets the X8R characteristics and × is granted to the sample which does not meet the X8R characteristics.

(Highly Accelerated Life Time)

The highly accelerated life time of the capacitor samples in which the interlayer thickness of the dielectric layer was 2.0 μm and the same in which the interlayer thickness of the dielectric layer was 3.0 μm was evaluated by retaining the capacitor samples in a state that a direct current voltage was applied to the capacitor samples in an electric field of 100 V at 175° C. and measuring the insulation degradation time of the capacitor samples. In the present Example, the time from the start of voltage application to the capacitor samples until the insulation resistance dropped by one digit was defined as the life time. In addition, in the present Example, the above evaluation was conducted for 20 capacitor samples, and the average failure time (MTTF) calculated through the Weibull analysis on this was defined as the average life time of the capacitor samples. In the present Example, the average life time of 5 hours or longer was evaluated to be favorable and the average life time of 10 hours or longer was evaluated to be significantly favorable. Incidentally, in Tables 1 and 2, ○ is granted to the sample which has the average life time of 10 hours or longer, Δ is granted to the sample which has the average life time of 5 hours or longer and shorter than 10 hours, and × is granted to the sample which has the average life time of shorter than 5 hours.

TABLE 1

| Sample No. | First sub-component | | | | | | | Second sub-component | | 3 μm | | 2 μm | | |
|---|---|---|---|---|---|---|---|---|---|---|---|---|---|---|
| | Eu | Ra | | | Rb | | | | | | | | | |
| | Eu(=α) | Yb | Others | β | Y | Tb | Others | y | SiO2(δ) | α/δ | X8R | HALT | CR product | X8R | HALT |
| 1* | 0.05 | 2.1 | | 2.1 | 0.5 | 0.9 | | 1.4 | 2.5 | 0.020 | ○ | ○ | ○ | X | X |
| 2 | 0.075 | 2.1 | | 2.1 | 0.5 | 0.9 | | 1.4 | 2.5 | 0.030 | ○ | ○ | ○ | ○ | ○ |
| 3 | 0.2 | 2.1 | | 2.1 | 0.5 | 0.9 | | 1.4 | 2.5 | 0.080 | ○ | ○ | ○ | ○ | ○ |
| 4 | 0.5 | 2.1 | | 2.1 | 0.5 | 0.9 | | 1.4 | 2.5 | 0.200 | ○ | ○ | ○ | ○ | ○ |
| 5* | 0.6 | 2.1 | | 2.1 | 0.5 | 0.9 | | 1.4 | 2.5 | 0.240 | ○ | ○ | ○ | X | ○ |
| 6* | 0.2 | 0.4 | | 0.4 | 0.5 | 0.9 | | 1.4 | 2.5 | 0.080 | ○ | ○ | ○ | X | ○ |
| 7 | 0.2 | 0.5 | | 0.5 | 0.5 | 0.9 | | 1.4 | 2.5 | 0.080 | ○ | ○ | ○ | ○ | ○ |
| 8 | 0.2 | 3 | | 3 | 0.5 | 0.9 | | 1.4 | 2.5 | 0.080 | ○ | ○ | ○ | ○ | ○ |
| 9* | 0.2 | 3.5 | | 3.5 | 0.5 | 0.9 | | 1.4 | 2.5 | 0.080 | ○ | ○ | ○ | ○ | X |
| 10 | 0.2 | | Sc: 2.1 | 2.1 | 0.5 | 0.9 | | 1.4 | 2.5 | 0.080 | ○ | ○ | ○ | ○ | ○ |
| 11 | 0.2 | | Er: 2.1 | 2.1 | 0.5 | 0.9 | | 1.4 | 2.5 | 0.080 | ○ | ○ | ○ | ○ | ○ |
| 12 | 0.2 | | Tm: 2.1 | 2.1 | 0.5 | 0.9 | | 1.4 | 2.5 | 0.080 | ○ | ○ | ○ | ○ | ○ |
| 13 | 0.2 | | Lu: 2.1 | 2.1 | 0.5 | 0.9 | | 1.4 | 2.5 | 0.080 | ○ | ○ | ○ | ○ | ○ |
| 14* | 0.2 | 2.1 | | 2.1 | | 0.85 | | 0.85 | 2.5 | 0.080 | ○ | ○ | ○ | ○ | X |
| 15 | 0.2 | 2.1 | | 2.1 | | 1.0 | | 1.0 | 2.5 | 0.080 | ○ | ○ | ○ | ○ | ○ |
| 16 | 0.2 | 2.1 | | 2.1 | | 4 | | 4 | 2.5 | 0.080 | ○ | ○ | ○ | ○ | ○ |
| 17* | 0.2 | 2.1 | | 2.1 | | 5 | | 5 | 2.5 | 0.080 | ○ | ○ | ○ | X | ○ |
| 18 | 0.2 | 2.1 | | 2.1 | | 0.9 | Dy: 0.5 | 1.4 | 2.5 | 0.080 | ○ | ○ | ○ | ○ | ○ |
| 19 | 0.2 | 2.1 | | 2.1 | 0.5 | | Dy: 0.9 | 1.4 | 2.5 | 0.080 | ○ | ○ | ○ | ○ | ○ |
| 20 | 0.2 | 2.1 | | 2.1 | | 0.9 | Ho: 0.5 | 1.4 | 2.5 | 0.080 | ○ | ○ | ○ | ○ | ○ |
| 21 | 0.2 | 2.1 | | 2.1 | | 0.9 | Gd: 0.5 | 1.4 | 2.5 | 0.080 | ○ | ○ | ○ | ○ | ○ |
| 22* | 0.2 | 2.1 | | 2.1 | 0.5 | 0.9 | | 1.4 | 1.25 | 0.160 | ○ | ○ | ○ | ○ | X |
| 23 | 0.2 | 2.1 | | 2.1 | 0.5 | 0.9 | | 1.4 | 1.5 | 0.133 | ○ | ○ | ○ | ○ | ○ |
| 24 | 0.2 | 2.1 | | 2.1 | 0.5 | 0.9 | | 1.4 | 5 | 0.040 | ○ | ○ | ○ | ○ | ○ |
| 25* | 0.2 | 2.1 | | 2.1 | 0.5 | 0.9 | | 1.4 | 5.5 | 0.036 | ○ | ○ | ○ | X | X |
| 26* | 0.10 | 2.1 | | 2.1 | 0.5 | 0.9 | | 1.4 | 4 | 0.025 | ○ | ○ | ○ | X | X |
| 27 | 0.10 | 2.1 | | 2.1 | 0.5 | 0.9 | | 1.4 | 3.3 | 0.030 | ○ | ○ | ○ | ○ | ○ |
| 28 | 0.5 | 2.1 | | 2.1 | 0.5 | 0.9 | | 1.4 | 2 | 0.250 | ○ | ○ | ○ | ○ | ○ |
| 29* | 0.5 | 2.1 | | 2.1 | 0.5 | 0.9 | | 1.4 | 1.5 | 0.333 | ○ | ○ | ○ | X | X |

*represents Comparative Example

TABLE 2

| Sample No. | Third sub-component Amount | Third sub-component Element | Fourth sub-component Amount | Fourth sub-component Element | Fifth sub-component Amount | Fifth sub-component Element | Sixth sub-component Amount | Sixth sub-component Element | 3 μm X8R | 3 μm HALT | 2 μm CR product | 2 μm X8R | 2 μm HALT |
|---|---|---|---|---|---|---|---|---|---|---|---|---|---|
| 30 | 0.4 | Ba | 0.3 | Mn | 0.05 | V | 0.8 | Mg | ○ | ○ | ○ | ○ | Δ |
| 31 | 0.5 | Ba | 0.3 | Mn | 0.05 | V | 0.8 | Mg | ○ | ○ | ○ | ○ | ○ |
| 32 | 4.0 | Ba | 0.3 | Mn | 0.05 | V | 0.8 | Mg | ○ | ○ | ○ | ○ | ○ |
| 33 | 4.5 | Ba | 0.3 | Mn | 0.05 | V | 0.8 | Mg | ○ | ○ | Δ | ○ | ○ |
| 34 | 2.0/1.0 | Ba/Ca | 0.3 | Mn | 0.05 | V | 0.8 | Mg | ○ | ○ | ○ | ○ | ○ |
| 35 | 4.0 | Ba | 0.035 | Mn | 0.05 | V | 0.8 | Mg | ○ | ○ | ○ | ○ | Δ |
| 36 | 4.0 | Ba | 0.05 | Mn | 0.05 | V | 0.8 | Mg | ○ | ○ | ○ | ○ | ○ |
| 37 | 4.0 | Ba | 0.3 | Mn | 0.05 | V | 0.8 | Mg | ○ | ○ | ○ | ○ | ○ |
| 38 | 4.0 | Ba | 0.4 | Mn | 0.05 | V | 0.8 | Mg | ○ | ○ | Δ | ○ | Δ |
| 39 | 4.0 | Ba | 0.3 | Cr | 0.05 | V | 0.8 | Mg | ○ | ○ | ○ | ○ | ○ |
| 40 | 4.0 | Ba | 0.1/0.1 | Mn/Cr | 0.05 | V | 0.8 | Mg | ○ | ○ | ○ | ○ | ○ |
| 41 | 4.0 | Ba | 0.3 | Mn | 0.005 | V | 0.8 | Mg | ○ | ○ | ○ | ○ | Δ |
| 42 | 4.0 | Ba | 0.3 | Mn | 0.010 | V | 0.8 | Mg | ○ | ○ | ○ | ○ | ○ |
| 43 | 4.0 | Ba | 0.3 | Mn | 0.15 | V | 0.8 | Mg | ○ | ○ | ○ | ○ | ○ |
| 44 | 4.0 | Ba | 0.3 | Mn | 0.20 | V | 0.8 | Mg | ○ | ○ | Δ | ○ | ○ |
| 45 | 4.0 | Ba | 0.3 | Mn | 0.05 | Mo | 0.8 | Mg | ○ | ○ | ○ | ○ | ○ |
| 46 | 4.0 | Ba | 0.3 | Mn | 0.05 | W | 0.8 | Mg | ○ | ○ | ○ | ○ | ○ |
| 47 | 4.0 | Ba | 0.3 | Mn | 0.025/0.025 | W/V | 0.8 | Mg | ○ | ○ | ○ | ○ | ○ |
| 48 | 4.0 | Ba | 0.3 | Mn | 0.05 | V | 0.3 | Mg | ○ | ○ | ○ | ○ | Δ |
| 49 | 4.0 | Ba | 0.3 | Mn | 0.05 | V | 0.5 | Mg | ○ | ○ | ○ | ○ | ○ |
| 50 | 4.0 | Ba | 0.3 | Mn | 0.05 | V | 1.8 | Mg | ○ | ○ | ○ | ○ | ○ |
| 51 | 4.0 | Ba | 0.3 | Mn | 0.05 | V | 2.0 | Mg | ○ | ○ | Δ | ○ | ○ |

From the above Tables 1 and 2, the temperature characteristics of capacitance was favorable and the highly accelerated life time was significantly favorable in a case in which the interlayer thickness was 3 μm in all Examples and Comparative Examples.

Sample Nos. 1 to 5 show Examples and Comparative Examples in which the content α of the oxide of Eu was changed. In Sample Nos. 2 to 4 in which the content α of the oxide of Eu met $0.075 \leq \alpha \leq 0.5$, the temperature characteristics of capacitance was favorable and the highly accelerated life time was significantly favorable even in a case in which the interlayer thickness was 2 μm as in the case in which the interlayer thickness was 3 μm. On the other hand, in Sample No. 1 in which α=0.05, the temperature characteristics of capacitance and the highly accelerated life time deteriorated in a case in which the interlayer thickness was 2 μm. And, in Sample No. 5 in which α=0.6, the temperature characteristics of capacitance deteriorated in a case in which the interlayer thickness was 2 μm.

Sample Nos. 6 to 9 show Examples and Comparative Examples in which the content β of the oxide of Ra was changed. In Sample Nos. 7 and 8 in which the content β of the oxide of Ra met $0.5 \leq \beta \leq 3$, the temperature characteristics of capacitance was favorable and the highly accelerated life time was significantly favorable even in a case in which the interlayer thickness was 2 μm as in the case in which the interlayer thickness was 3 μm. On the other hand, in Sample No. 6 in which β=0.4, the temperature characteristics of capacitance deteriorated in a case in which the interlayer thickness was 2 μm. And, in Sample No. 9 in which β=3.5, the highly accelerated life time deteriorated in a case in which the interlayer thickness was 2 μm.

Sample Nos. 10 to 13 show Examples in which the kind of Ra was changed from Yb to Sc (Sample No.10), Er (Sample No.11), Tm (Sample No.12), and Lu (Sample No.13). In Sample Nos. 10 to 13, the temperature characteristics of capacitance was favorable and the highly accelerated life time was significantly favorable even in a case in which the interlayer thickness was 2 μm as in the case in which the interlayer thickness was 3 μm.

Sample Nos. 14 to 17 show Examples and Comparative Examples in which only Tb was used as Rb and the content γ of the oxide of Rb (Tb) was changed. In Sample Nos. 15 and 16 in which the content γ of the oxide of Rb met $1.0 \leq \gamma \leq 4$, the temperature characteristics of capacitance was favorable and the highly accelerated life time was significantly favorable even in a case in which the interlayer thickness was 2 μm as in the case in which the interlayer thickness was 3 μm. On the other hand, in Sample No. 14 in which γ=0.85, the highly accelerated life time deteriorated in a case in which the interlayer thickness was 2 μm. And, in Sample No.17 in which γ=5, the temperature characteristics of capacitance deteriorated in a case in which the interlayer thickness was 2 μm.

Sample Nos. 18 to 21 show Examples in which the kind of Rb was changed from Y+Tb to Dy+Tb (Sample No. 18), Y+Dy (Sample No.19), Tb+Ho (Sample No.20), and Tb+Gd (Sample No.21) in comparison to Sample No.3. In Sample Nos. 18 to 21, the temperature characteristics of capacitance was favorable and the highly accelerated life time was significantly favorable even in a case in which the interlayer thickness was 2 μm as in the case in which the interlayer thickness was 3 μm.

Sample Nos. 22 to 29 show Examples and Comparative Examples in which the content α of the oxide of Eu and the content δ of the oxide of Si were changed. In Sample Nos. 23, 24, 27 and 28 in which the content α of the oxide of Eu and the content δ of the oxide of Si met $1.5 \leq \delta \leq 5.0$ and $0.030 \leq \alpha/\delta \leq 0.250$, the temperature characteristics of capacitance was favorable and the highly accelerated life time was significantly favorable even in a case in which the interlayer thickness was 2 μm as in the case in which the interlayer thickness was 3 μm. On the other hand, in Sample No.22 in which δ=1.25, the highly accelerated life time deteriorated in a case in which the interlayer thickness was 2 μm. In Sample No.25 in which δ=5.5, the temperature characteristics of capacitance and the highly accelerated life time deteriorated in a case in which the interlayer thickness was 2 μm. In Sample No.26 in which α/Δ=0.025, the temperature characteristics of capacitance and the highly accelerated life time deteriorated in a case in which the interlayer thickness was 2 µm. And, in Sample No. 29 in which α/δ=0.333, the temperature characteristics of capacitance and the highly accelerated life time deteriorated in a case in which the interlayer thickness was 2 µm.

Sample Nos. 30 to 51 show Examples in which the kinds and the contents of the third to sixth sub-components were changed from those in Sample No. 3, while the kinds and the contents of the main component, the first sub-component and the second sub-component were made same to those in Sample No. 3.

Sample Nos. 30 to 34 show Examples in which the kind and the content of the third sub-component were changed. Incidentally, in Sample No. 34, the contents of BaO and CaO were respectively 2.0 moles and 1.0 mole, and the content of the third sub-component was 3.0 moles with respect to 100 moles of the main component.

Sample Nos. 30 to 34 showed favorable results in all characteristics. Particularly, in Sample Nos. 31, 32 and 34 in which the contents of the third sub-component were from 0.5 to 4 moles, the CR product and the temperature characteristics of capacitance were favorable and the highly accelerated life time was significantly favorable.

Sample Nos. 35 to 40 show Examples in which the kind and the content of the fourth sub-component were changed. Incidentally, in Sample No. 39, the content of $Cr_2O_3$ was 0.3 mole with respect to 100 moles of the main component. In Sample No. 40, the contents of MnO and $Cr_2O_3$ were respectively 0.1 mole and 0.1 mole, and the content of the fourth sub-component was 0.2 mole with respect to 100 moles of the main component.

Sample Nos. 35 to 40 showed favorable results in all characteristics. Particularly, in Sample Nos. 36, 37, 39 and 40 in which the contents of the fourth sub-component were from 0.05 to 0.3 mole, the CR product and the temperature characteristics of capacitance were favorable and the highly accelerated life time was significantly favorable.

Sample Nos. 41 to 47 show Examples in which the kind and the content of the fifth sub-component were changed. Incidentally, in Sample No. 45, the content of $Mo_2O_3$ was 0.05 mole with respect to 100 moles of the main component. In Sample No. 46, the content of $WO_3$ was 0.05 mole with respect to 100 moles of the main component. In Sample No. 47, the contents of $WO_3$ and $V_2O_5$ were respectively 0.025 mole and 0.025 mole, and the content of the fifth sub-component was 0.05 mole with respect to 100 moles of the main component.

Sample Nos. 41 to 47 showed favorable results in all characteristics. Particularly, in Sample Nos. 42, 43, 45 to 47 in which the contents of the fifth sub-component were from 0.010 to 0.15 mole, the CR product and the temperature characteristics of capacitance were favorable and the highly accelerated life time was significantly favorable.

Sample Nos. 48 to 51 show Examples in which the content of the sixth sub-components was changed.

Sample Nos. 48 to 51 showed favorable results in all characteristics. Particularly, in Sample Nos. 49 and 50 in which the contents of the sixth sub-component were from 0.5 to 1.8 moles, the CR product and the temperature characteristics of capacitance were favorable and the highly accelerated life time was significantly favorable.

REFERENCE SIGNS LIST

1 Laminated ceramic capacitor
2 Dielectric layer
3 Internal electrode layer
4 External electrode
10 Capacitor device body

The invention claimed is:

1. A dielectric ceramic composition comprising:
a main component having a perovskite crystal structure expressed by general formula $ABO_3$ where A is at least one selected from Ba, Ca, and Sr and B is at least one selected from Ti and Zr;
a first sub-component of oxides of at least three rare earth elements containing Eu; and
a second sub-component of an oxide of Si,
wherein at least an oxide of Eu, an oxide of Ra and an oxide of Rb are contained as the first sub-component where Ra is at least one selected from Sc, Er, Tm, Yb and Lu, and Rb is at least one selected from Y, Dy, Ho, Tb and Gd, $0.075 \leq \alpha \leq 0.5$, $0.5 \leq \beta \leq 3$, $1.0 \leq \gamma \leq 4$, $1.5 \leq \delta \leq 5$, and $0.030 \leq \alpha/\delta \leq 0.250$ where a content of an oxide of Eu is α mole in terms of $Eu_2O_3$, a content of the oxide of Ra is β mole in terms of $Ra_2O_3$, a content of the oxide of Rb is γ mole in terms of $Rb_2O_3$, and a content of the second sub-component is δ mole in terms of $SiO_2$ with respect to 100 moles of the main component.

2. The dielectric ceramic composition according to claim 1, further comprising a third sub-component of an oxide of Ba and/or an oxide of Ca, wherein a content of the third sub-component with respect to 100 moles of the main component is from 0.5 to 4 moles in terms of BaO or CaO.

3. The dielectric ceramic composition according to claim 1, further comprising a fourth sub-component of an oxide of Mn and/or an oxide of Cr, wherein a content of the fourth sub-component with respect to 100 moles of the main component is from 0.05 to 0.3 moles in terms of MnO or $Cr_2O_3$.

4. The dielectric ceramic composition according to claim 1, further comprising a fifth sub-component of at least one selected from an oxide of V, an oxide of Mo, and an oxide of W, wherein a content of the fifth sub-component with respect to 100 moles of the main component is from 0.010 to 0.15 moles in terms of $V_2O_5$, $Mo_2O_3$, or $WO_3$.

5. The dielectric ceramic composition according to claim 1, further comprising a sixth sub-component of an oxide of Mg, wherein a content of the sixth sub-component with respect to 100 moles of the main component is from 0.5 to 1.8 moles in terms of MgO.

6. A ceramic electronic device comprising a dielectric layer formed of the dielectric ceramic composition according to claim 1 and an electrode layer.

7. The ceramic electronic device according to claim 6, wherein the thickness of the dielectric layer is 2 µm or less.

* * * * *